March 17, 1925.						1,529,703
H. W. JONES
INSULATING MEANS FOR GALVANIC CELLS
Filed May 9, 1924
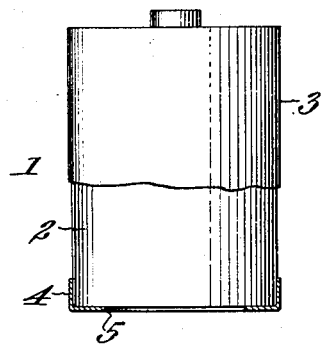
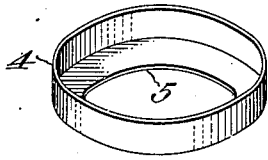
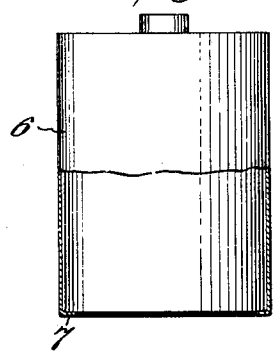
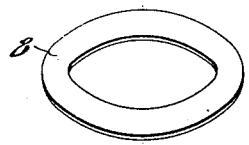
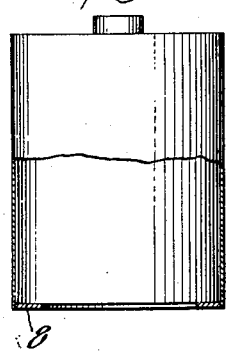
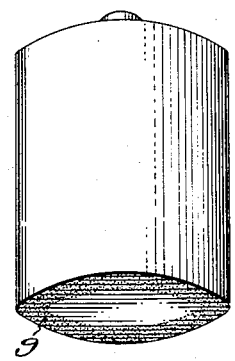
Inventor:
Homer W. Jones,
By Byrnes Townsend & Brickenstein,
Attorneys.

Patented Mar. 17, 1925.

1,529,703

UNITED STATES PATENT OFFICE.

HOMER W. JONES, OF FLUSHING, NEW YORK, ASSIGNOR TO NATIONAL CARBON COMPANY, INC., A CORPORATION OF NEW YORK.

INSULATING MEANS FOR GALVANIC CELLS.

Application filed May 9, 1924. Serial No. 712,130.

*To all whom it may concern:*

Be it known that I, HOMER W. JONES, a citizen of the United States, residing at Flushing, in the county of Queens and State of New York, have invented certain new and useful Improvements in Insulating Means for Galvanic Cells, of which the following is a specification.

This invention relates to galvanic batteries in which two or more of the component cells are placed in contact to establish electrical connection between the cells. The invention provides means adapted in general to prevent completion of the battery circuit if a cell is improperly inserted. In a preferred form, as applied to cells having a metallic container, such means comprises insulation applied about the margin only of the bottom of the container. This prevents electrical connection if the bottoms of two cells are placed in abutting relation. Such reversal of the direction of cells is an error which is not infrequently made by inexperienced users of flashlights or the like.

Reference is to be made to the acompanying drawing, in which—

Fig. 1 is a side elevation of a cell with its jacket partly broken away and showing the novel insulating means in section;

Fig. 2 is a perspective view of the insulating means of Fig. 1;

Figs. 3 and 4 are views similar to Fig. 1, showing modifications;

Fig. 5 is a perspective view of the insulating means of Fig. 4; and

Fig. 6 is a perspective view showing a further modification.

In Figs. 1 and 2 reference numeral 1 denotes a cell, which may be a Le Clanché dry cell of the familiar commercial type. The zinc cup 2 of the cell may have the usual jacket 3. The present invention resides in the means for partially insulating the bottom of the cup, in this embodiment a cap 4 having a central perforation 5. The cap may be held in place in any suitable way, as by an adhesive, or by being tightly fitted or shrunk on the cup. When the cells are properly arranged, the carbon pole of each cell makes contact with the zinc bottom of the next superposed cell, through the perforation 5 of the insulating cap.

It will be clear that cap 5 would prevent contact between the bottoms of two cells, should they be placed together. Therefore, in the assembly of a series battery of cells for a tubular flashlight, for example, reversal of one of the cells would break the circuit. The person assembling the cells may be expected to realize that the inoperativeness of the flashlight is due to the fact that the cells are wrongly arranged. Correction may then be made without difficulty.

Heretofore, in the absence of the insulating member provided by the present invention, a cell inserted in the wrong direction is either short-circuited or works in opposition to the other cells. The improved construction substantially decreases the chance of incorrect assembly with its attendant difficulties.

The form of the invention shown in Fig. 3 comprises a cell wrapper 6 of insulating material having its lower end turned under to form a flange 7. In Figs. 4 and 5 another form is shown involving the insertion of an insulating annulus 8 set upon the bottom of the cell between the extended sides of its wrapper. Fig. 6 illustrates a cell having a coating 9 of varnish or other insulating material upon the margin of the bottom. The principle of all these forms is the same as that of the type described in connection with Figs. 1 and 2.

While the annular insulation shown is a preferred form, the same result may be obtained by short strips or other discontinuous marginal insulation. Various other embodiments of the invention fall within the scope of the invention as defined in the appended claims.

I claim:

1. In a galvanic cell having a conductive container, insulating means covering a portion only of the bottom of the container and adapted to prevent electrical contact with the bottom of another cell, whereby erroneous assembly of cells is minimized.

2. In a galvanic cell having a conductive container, marginal insulating means on the bottom of the container and adapted to prevent electrical contact with the bottom of another cell, the central portion of the container bottom being exposed to electrical contact.

3. In a dry cell comprising a zinc container, annular insulating means on the bottom of the container and adapted to prevent electrical contact with the bottom of another cell.

4. In a dry cell comprising a zinc container, an insulating cap fitted upon the bottom of said container and adapted to prevent electrical contact with the bottom of another cell, said cap having a central perforation.

In testimony whereof, I affix my signature.

HOMER W. JONES.